United States Patent

Iwamoto et al.

[11] Patent Number: 5,968,451
[45] Date of Patent: Oct. 19, 1999

[54] PROCESS AND APPARATUS FOR STERILIZING CONTAINER HOLDING FLUID DIET

[75] Inventors: Tsutomu Iwamoto, Yokohama; Yoshinori Ohtsuka, Shizuoka-ken; Nobuo Kiriu, Mishima; Norihito Watanabe, Yokohama, all of Japan

[73] Assignee: Morinaga & Co., Ltd., Tokyo, Japan

[21] Appl. No.: 08/873,885

[22] Filed: Jun. 12, 1997

[30] Foreign Application Priority Data

Jun. 13, 1996 [JP] Japan .................................. 8-174291

[51] Int. Cl.⁶ ...................................................... A61L 2/00
[52] U.S. Cl. ................................. 422/38; 99/360; 99/483; 422/40; 422/41; 422/303; 422/304; 422/307; 426/521
[58] Field of Search ................................. 422/1, 38, 40, 422/41, 302, 303, 304, 307; 99/323.3, 355, 359, 360, 483, 644; 426/325, 330.3, 330.5, 521

[56] References Cited

U.S. PATENT DOCUMENTS

| | | | |
|---|---|---|---|
| 1,227,101 | 5/1917 | Wehmiller | 422/38 |
| 2,296,974 | 9/1942 | Beal | 422/38 |
| 3,575,713 | 4/1971 | Duff et al. | 422/304 |
| 3,972,679 | 8/1976 | Ruig | 422/304 |
| 4,499,056 | 2/1985 | Tokano et al. | 422/304 |
| 5,609,819 | 3/1997 | Shimizu et al. | 422/303 |

FOREIGN PATENT DOCUMENTS 370 975  5/1990  European Pat. Off. .

OTHER PUBLICATIONS

Publication No. 06098732, Dec. 4, 1994, *Patent Abstracts of Japan*, Abstract only of Japanese Patent Application No. 04278182, filed Sep. 22, 1992.

*Primary Examiner*—Krisanne Thornton
*Attorney, Agent, or Firm*—Smith, Gambrell & Russell; Beveridge, DeGrandi, Weilacher & Young Intellectual Property Group

[57] ABSTRACT

A process for sterilizing a container holding a fluid diet, the container having a long and slender mouth and being filled with the fluid diet and sealed; the process includes the steps of filling the container with the fluid diet in a heated state, sealing the container at the mouth thereof, and thereafter turning the container with its mouth side down to immerse only the mouth and the vicinity thereof in a hot-water bath for a period of time sufficient to achieve sterilization. An apparatus for carrying out the process includes a bucket conveyor, a feed conveyor, a bucket and a bath. The process and apparatus can well sterilize containers holding a fluid diet and having a long and slender mouth. The process and apparatus can well sterilize containers holding a fluid diet and having a long and slender mouth.

16 Claims, 5 Drawing Sheets

PROCESS AND APPARATUS FOR STERILIZING CONTAINER HOLDING FLUID DIET

FIELD OF THE INVENTION

This invention relates to a process, and an apparatus, for sterilizing a container holding a fluid diet (herein meant to be a diet including not only liquid diets but also diets having gelled softly enough to be suckable with, e.g., a straw, and inclusive of liquid diets and jelly drinks), the container having a long and slender mouth and being filled with the fluid diet and sealed.

BACKGROUND OF THE INVENTION

Acidic fluid diet including liquid diets (such as fruit juice) and jelly drinks (herein meant to be jelly diets having gelled softly or partly enough to retain a fluidity) are commonly not required to be retort-sterilized. Accordingly, fluid diet sterilized by heating is put into a container in a heated state, and the container is sealed at its mouth, which is then turned upside down to sterilize the inner wall and mouth of the container by utilizing the heat of the fluid diet. This method is what is called hot packing, employed as a sterilization packing process.

Depending on products, another method is employed in which a container is filled with fluid diet and sealed and thereafter the whole container is immersed in hot water so as to be sterilized. Still another method is also employed in which a container is filled with fluid diet and sealed and thereafter hot water or steam is sprayed to the container so as to be sterilized.

Meanwhile, in recent years, as containers for such fluid diet, it has become popular to use those comprising a bag member formed of a flexible sheet, a straw-shaped mouth inserted to the bag member, and a cap thread-fitted to the tip of the mouth.

FIG. 8 illustrates an example of such containers, a container 11, which comprises a bag member 12 formed of a laminated sheet of plastic film and metal foil, a mouth 13 having the shape of a straw, inserted to one end of the bag member 12 and joined to the bag member 12 by, e.g., heat sealing, and a cap 14 thread-fitted to the projected end of the mouth 13.

This container 11 is so made up that the mouth 13 has an inner diameter of 1.5 cm or less, and usually 1 cm or less and the mouth 13 has a length L of 1 cm or more, and usually 2 cm or more. The mouth 13 and the cap 14 are made of a synthetic resin such as polyester.

In the case of this container 11, the container itself is comprised of the bag member 12, having a flexibility, and hence the mouth 13 can be used as a substitute for a straw to suck the inside fluid diet. Thus, such containers are going to be widely used for jelly drinks.

There is, however, a problem which has been found in the instance where the container 11 having a long and slender mouth 13 as shown in FIG. 8 is filled with the fluid diet by the conventional process, what is called hot packing. In such an instance, after the container is filled with a heated fluid diet, the container is turned upside down in order to sterilize the container up to the mouth 13, where the fluid diet can be flowed into the mouth 13 with difficulty, and, even when flowed into it, the temperature drops before the fluid diet reaches the tip of the mouth 13, so that the inner walls of the mouth 13 and cap 14 can not be well sterilized.

As a method to solve the above problem, one may contemplate filling the container 11 with the heated fluid diet and thereafter immersing the whole container 11 in hot water or the like to again heat it. This, however, results in excessive heating of the fluid diet held in the container to tend to cause deterioration of flavor in the case of fruit juice or the like and cause a decrease in jelly strength in the case of jelly drinks, bringing about the problem of a lowering of product quality.

One may also contemplate filling the container 11 with heated fluid diet and thereafter spraying hot water or hot steam to only the mouth 13 and cap 14 of the container 11. This, however, results in a great consumption of heat energy, and may make working atmosphere bad because of the hot steam hanging over surroundings, which may also adversely affect the surrounding equipment and may make the heating temperature of the mouth 13 and cap 14 non-uniform, bringing about the problem that no stable heat sterilization effect can be obtained.

SUMMARY OF THE INVENTION

Accordingly, an object of the present invention is to provide a process, and an apparatus, for sterilizing a container holding a fluid diet that can well sterilize the mouth of the container when a container having a long and slender mouth is filled with a fluid diet and sealed to obtain the container holding the fluid diet, and can prevent deterioration of the quality of the fluid diet held in the container.

To achieve the above object, the process of the present invention is a process for sterilizing a container holding a fluid diet, the container having a long and slender mouth and being filled with the fluid diet and sealed;

the process comprising the steps of filling the container with the fluid diet in a heated state, sealing the container at the mouth thereof, and thereafter turning the container with its mouth side down to immerse only the mouth and the vicinity thereof in a hot-water bath.

The apparatus of the present invention is an apparatus for sterilizing a container holding a fluid diet, the container having a long and slender mouth and being filled with the fluid diet and sealed;

the apparatus comprising a bucket conveyor for transporting the container holding a fluid diet, transporting while supporting the container with its up side down; a feed conveyor for carrying the container holding a fluid diet, into a bucket of the bucket conveyor at the starting end thereof while supporting the container with its up side down; and a hot-water bath provided along the transport path of the bucket conveyor and capable of holding hot water so that the mouth of the container holding a fluid diet and the vicinity thereof are immersed while being upside down supported on the bucket conveyor.

DESCRIPTION OF THE PREFERRED EMBODIMENTS

Figure 1:
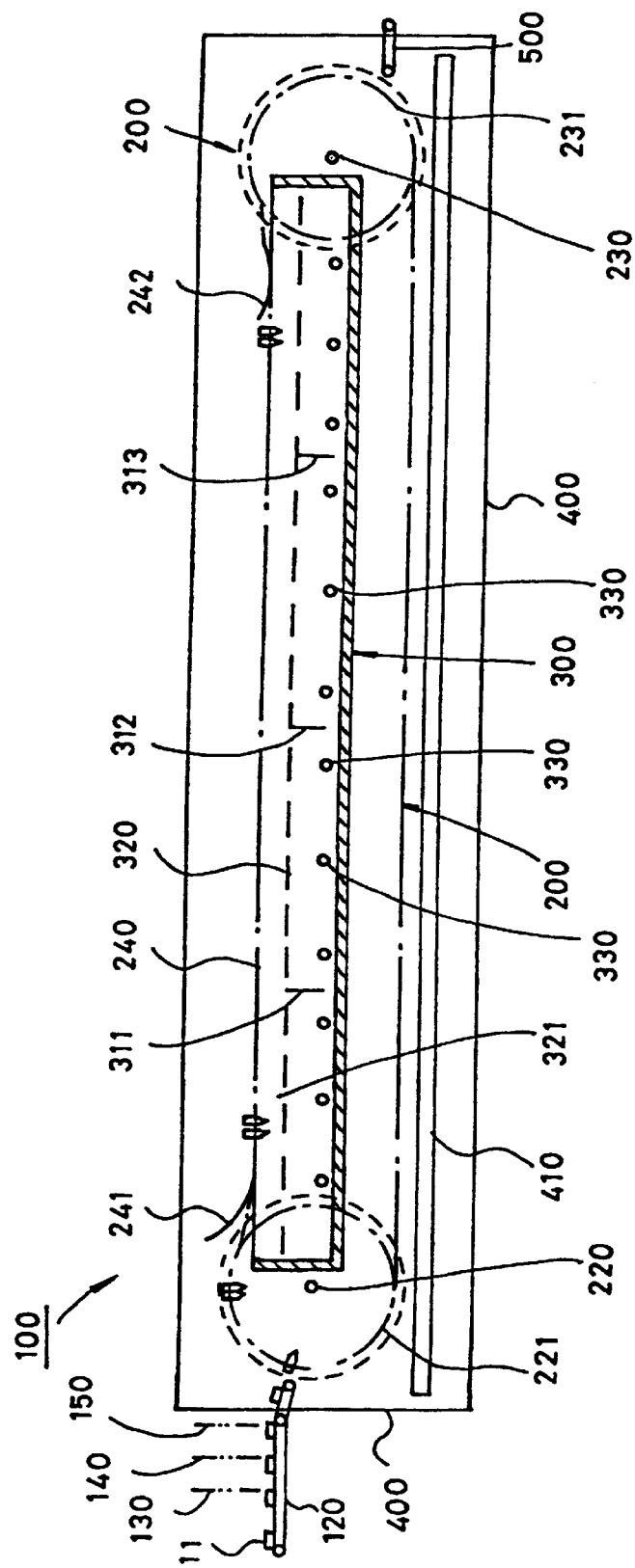
FIG. 1 is an elevational cross section showing an example of the apparatus for sterilizing a container holding a fluid diet according to the present invention.

In the process of the present invention for sterilizing a container holding a fluid diet, the container has a long and slender mouth and is filled with the fluid diet and sealed. The container is filled with the fluid diet in a heated state, sealed at the mouth thereof, and thereafter turned with its mouth side down to immerse only the mouth and the vicinity thereof in a hot-water bath.

Since the container is filled with the fluid diet in a heated state, sealed at the mouth thereof, and thereafter turned with its mouth side down to immerse only the mouth and the vicinity thereof in a hot-water bath, the mouth which is long and slender and therefore can be sterilized with difficulty can be well sterilized and also the fluid diet held therein can be free from excessive heating to prevent its quality from deteriorating. Compared with a process in which hot water or steam is sprayed to the mouth, the present process may cause only a small loss of heat energy and can make the heating temperature of the mouth uniform, so that the sterilization can be surely made.

In the sterilization process of the present invention, the mouth of the container may have an inner diameter of 1.5 cm or less and a length of 1 cm or more. When the present invention is applied to the container having such a mouth, which can be sterilized with difficulty, it becomes possible to sterilize any products employing such a container, in a good workability and for sure, so that a higher industrial significance can be brought about.

In a preferred embodiment of the sterilization process of the present invention, the container holding a fluid diet is inserted and supported with its upside down in a bucket conveyor, and only the mouth and the vicinity thereof are immersed in the hot-water bath while transporting the container with its mouth side down and then taken out. Thus, only the mouth and the vicinity thereof can-be immersed in the hot-water bath in a good workability and automatically.

In the sterilization process of the present invention, the fluid diet may be an acidic drink or jelly drink having a pH of 4.2 or below. When the fluid diet intended in the present invention is limited to such an acidic drink or jelly drink which can be sterilized by what is called the hot packing, a higher industrial significance can be brought about.

In a preferred embodiment of the sterilization process of the present invention, the hot-water bath may have a water temperature of from 85° C. to 98° C. and the mouth and the vicinity thereof may be immersed in the hot-water bath for an immersion time of from 1 minute to 10 minutes, whereby the mouth and the vicinity thereof can be more surely sterilized. If the water temperature is lower than 85° C. or the immersion time is shorter than 1 minute, there is a possibility of insufficient sterilization. If the water temperature is higher than 98° C., the steam may be generated in a large quantity to make it difficult to make environmental control around the hot-water bath. If the immersion time is longer than 10 minutes, the heating may become excessive, resulting in a poor workability and a loss of heat energy.

In a preferred embodiment of the sterilization process of the present invention, the container may comprise a bag member formed of a flexible sheet, a straw-shaped mouth inserted to the bag member, and a cap thread-fitted to the tip of the mouth. When the present invention is applied to such a container comprised of a flexible bag member having a straw-shaped mouth which tends to be insufficiently sterilized, it becomes possible to use such a container without anxiety.

In the apparatus for sterilizing a container holding a fluid diet, the container has a long and slender mouth and is filled with the fluid diet and sealed. The apparatus is chiefly constituted of a bucket conveyor for transporting the container holding a fluid diet, transporting while supporting the container with its up side down; a feed conveyor for carrying the container holding a fluid diet, into a bucket of the bucket conveyor at the starting end thereof while supporting the container with its up side down; and a hot-water bath provided along the transport path of the bucket conveyor and capable of holding hot water so that the mouth of the container holding a fluid diet and the vicinity thereof are immersed while being upside down supported on the bucket conveyor.

In a preferred embodiment of the sterilization apparatus of the present invention, the feed conveyor is provided, at given intervals, with a plurality of timing gates for blocking the movement of a plurality of containers so that containers each holding a fluid diet are delivered at given timing. When a plurality of containers are continuously fed, the containers being transported while holding fluid diet are temporarily stopped at the timing gates provided on the feed conveyor and are delivered in synchronization with the rotational timing of the bucket conveyor, and hence the containers can be surely carried into each bucket of the bucket conveyor.

In a preferred embodiment of the sterilization apparatus of the present invention, the bucket conveyor is provided with a plurality of buckets and each bucket has a bottom having a through-hole from which the mouth of the container holding a fluid diet is to be projected downward. Since the mouths of the containers holding a fluid diet can be projected downward from the bottom of each bucket of the bucket conveyor through the hole, the mouth and the vicinity thereof can be more effectively heated and sterilized.

In a preferred embodiment of the sterilization apparatus of the present invention, the hot-water bath comprises a hot-water bath main body formed of a plate having a heat insulating material, at least one partition plate provided at least at the middle in the depth direction of the bath so as to partition the hot-water bath main body at given intervals in its longitudinal direction, and at least one hot-steam jetting pipe provided in the hot-water bath main body. Since the hot-water bath main body is formed of a plate having a heat insulating material, any loss of heat energy can be made lower. Also, since the partition plate that partitions the hot-water bath main body in its longitudinal direction is provided in this way, the temperature of hot water can be, e.g., stepwise changed to control sterilization conditions.

The present invention will be described in greater detail with reference to the accompanying drawings.

Figure 2:
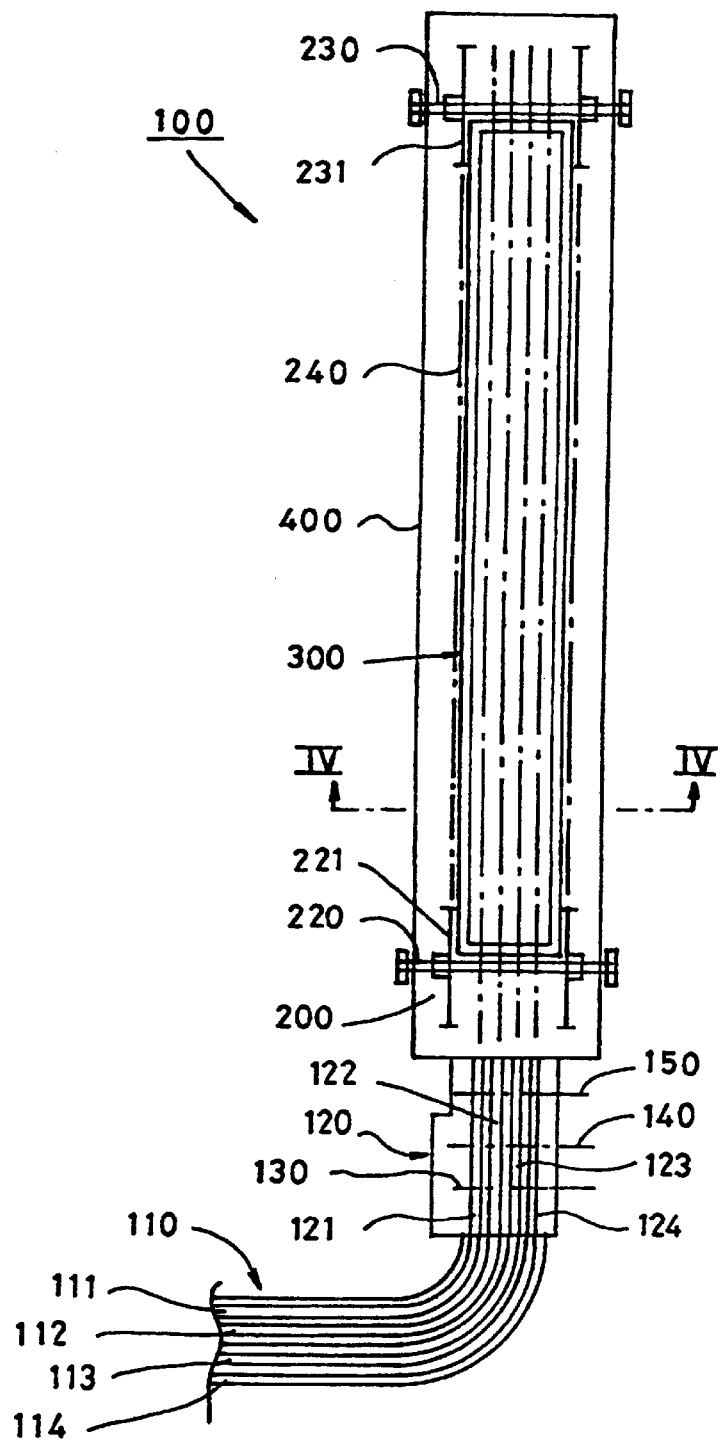
FIG. 2 is a top plan view of the apparatus.
Figure 3:
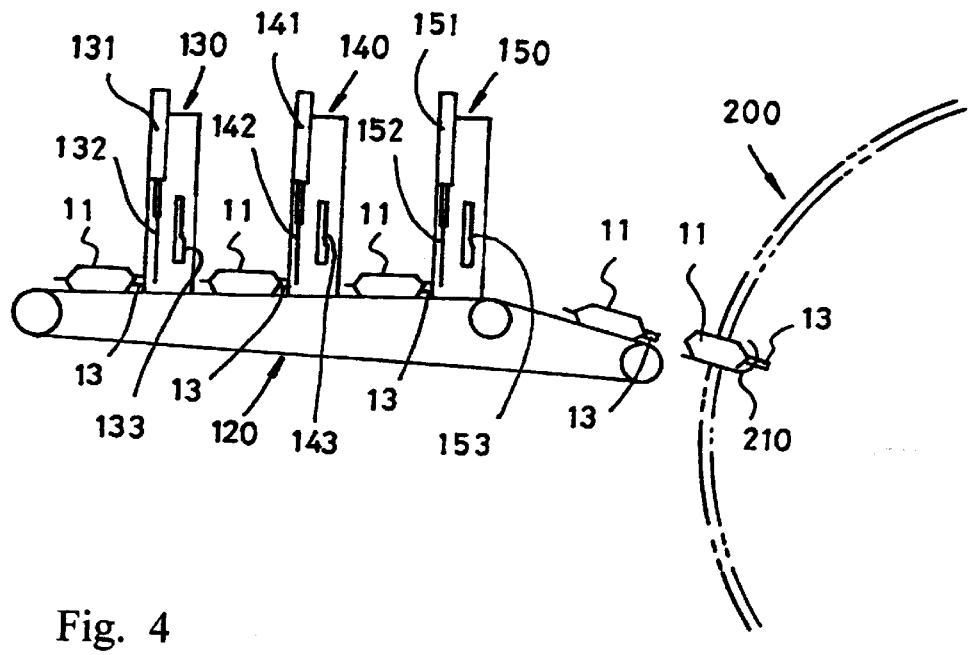
FIG. 3 is a side view of the feed conveyor used in the apparatus.
Figure 4:
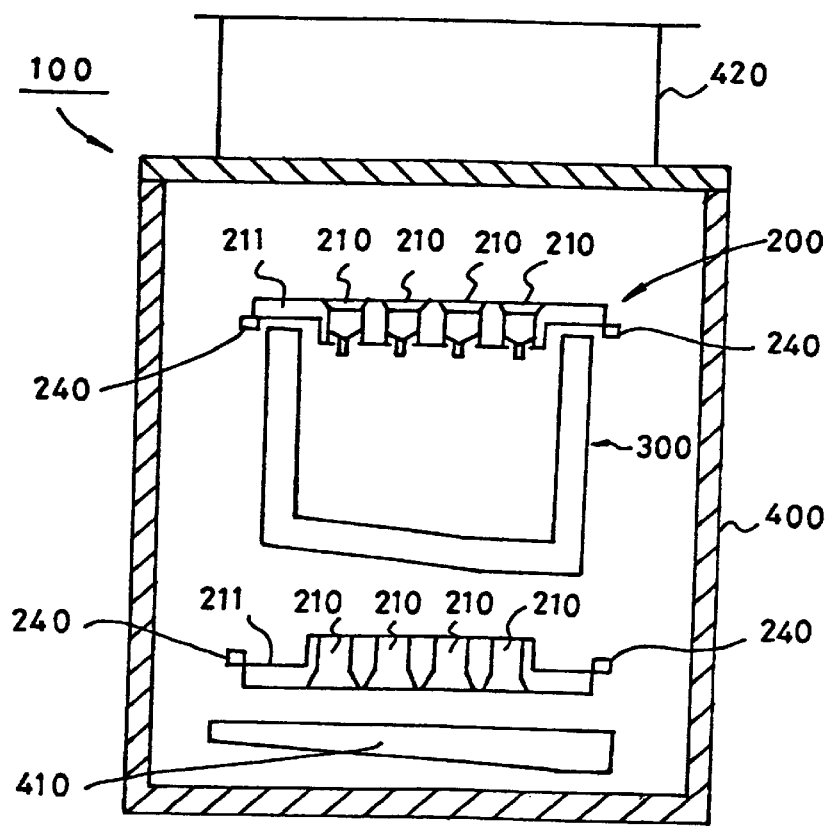
FIG. 4 is a cross section along the line IV—IV in FIG. 2.
Figure 5:
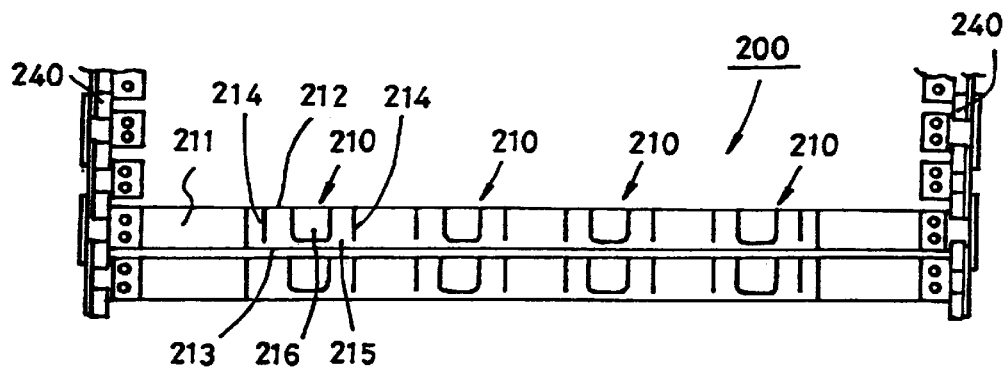
FIG. 5 is a partial plan view of the bucket conveyor used in the apparatus.
Figure 6:
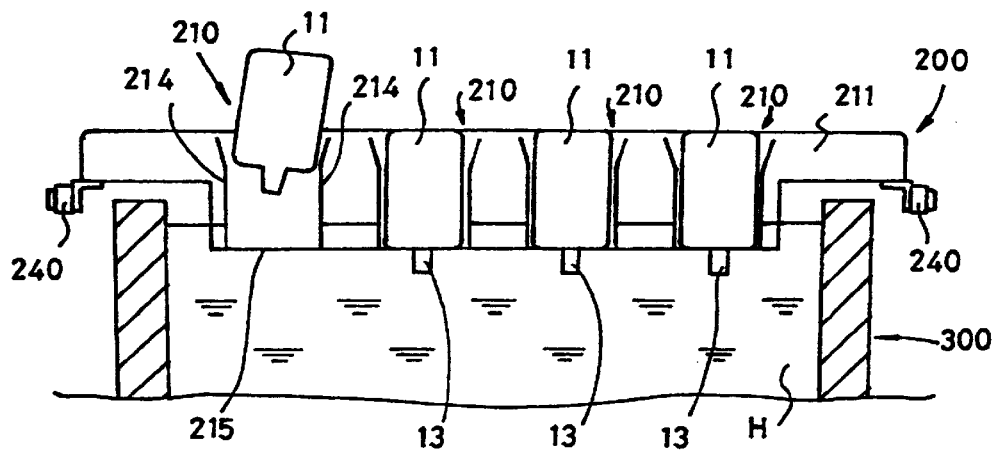
FIG. 6 is a partial cross section of the bucket conveyor used in the apparatus.

FIGS. 1 to 7 illustrate an example of the apparatus for sterilizing a container holding a fluid diet according to the present invention. FIG. 1 is an elevational cross section of the apparatus; FIG. 2, a top plan view of the apparatus; FIG. 3, a side view of the feed conveyor; FIG. 4, a cross section along the line IV—IV in FIG. 2; FIG. 5, a partial plan view of the bucket conveyor; FIG. 6, a partial cross section of the bucket conveyor; and FIG. 7, a vertical cross section of a bucket of the bucket conveyor.

As shown in FIG. 2, this apparatus, 100, has a first feed conveyor 110, a second feed conveyor 120 adjacent to the terminal of the first feed conveyor 110, a bucket conveyor 200 adjacent to the terminal of the second feed conveyor 120, and a hot-water bath 300 provided along the transport line of the bucket conveyor 200.

The first feed conveyor 110 has four lines 111, 112, 113 and 114 extending in parallel. At the start ends of the respective lines 111, 112, 113 and 114, filling machines (not shown) for putting a fluid diet into containers are respectively correspondingly provided. The respective filling machines fill the containers with the fluid diet, seal the containers filled with the fluid diet, and thereafter feed the resulting containers to the respective lines 111, 112, 113 and 114 of the first feed conveyor 110.

The second feed conveyor 120 provided at the terminal of the first feed conveyor 110 in such a way that its start end is adjacent to the latter's terminal is so designed that its transport speed is higher than that of the first feed conveyor 110. Accordingly, after the containers moved forward on the first feed conveyor 110 are placed on the second feed conveyor 120, they are transported at broader intervals between them. The second feed conveyor 120 also have four lines 121, 122, 123 and 124 extending in parallel, corresponding to the lines 111, 112, 113 and 114 of the first feed conveyor 110.

With reference to FIG. 3 together, three timing gates 130, 140 and 150 are provided on the second feed conveyor 120. The timing gates 130, 140 and 150 respectively have air cylinders 131, 141 and 151, shutters 132, 142 and 152 interlocking with working rods of the air cylinders, and sensors 133, 143 and 153 for detecting the pass of the containers 11.

The air cylinders 131, 141 and 151 open the shutters 132, 142 and 152 in synchronization with the working timing of the bucket conveyor 200, i.e., at the time a bucket 210 of the bucket conveyor 200 comes to the feed position at the terminal of the second feed conveyor 120, and work so as to close the shutters 132, 142 and 152 once the sensors 133, 143 and 153 have detected the pass of the containers 11. The timing gates 130, 140 and 150 are separately provided for each line of the lines 121, 122, 123 and 124.

The bucket conveyor 200 has a sprocket 221 fitted to a rotating shaft 220 supported at one end of a casing 400, a sprocket 231 fitted to a rotating shaft 230 supported at the other end of the casing 400, and a driving chain 240 extended between the sprockets 221 and 231. The sprockets 221 and 231 and the driving chain 240 are respectively provided in pair on both sides of the hot-water bath 300. Also, as shown in FIG. 1, the driving chain 240 is supported by chain guides 241 and 242 at its upper traveling portion so that it enters the inside of the hot-water bath 300 at that portion.

With reference to FIGS. 4 to 7 together, the driving chains 240 provided on both sides of the hot-water bath 300 are each provided so as to pass the top and bottom of the hot-water bath 300. Between the driving chains 240 provided in pair, a bucket support member 211 is provided across them, and four buckets 210 are provided to the bucket support member 211. Each bucket 210 is constituted of front and rear plates 212 and 213 with which the front and rear of the container respectively touch, partition plates 214 with which the both sides of the container touch, a bottom wall 215, and a through-hole formed in the bottom wall 215. As shown especially in FIG. 7, the front and rear plates 212 and 213 and the bottom wall 215 are constituted of a single plate bent in a J-shape as viewed from the side, and the through-hole 216 is formed at its lower end so that the mouth 13 and cap 14 of the container 11 can be projected downward through the through-hole 216 when the container 11 is inserted upside down.

The hot-water bath 300 is formed of a heat insulating plate comprising a metal plate covered with a heat insulating material such as urethane foam or glass fiber. As shown in FIG. 4, a water-receiving tray 410 is provided beneath the hot-water bath 300. The casing 400 is so provided that it surrounds the hot-water bath 300 and the bucket conveyor 200. An exhaust vent 420 is provided at the top of the casing 400.

The hot-water bath 300 has a long and slender shape along the transport path of the bucket conveyor 200, and is provided with partition plates 311, 312 and 313 at given intervals in its longitudinal direction. The partition plates 311, 312 and 313 are each provided at the middle in the depth direction of the hot-water bath 300 so that the hot water can flow through its upper and lower portions. Alternatively, the partition plates 311, 312 and 313 may be so provided that they completely partition the inside of the hot-water bath 300. The partition plates 311, 312 and 313 provided in this way make it possible to, e.g., stepwise change the temperature of the hot water inside the hot-water bath 300.

At a middle height in the depth direction of the hot-water bath 300, a perforated plate 320 such as a punching metal is horizontally provided, and hot-steam jetting pipes 330 are provided at given intervals beneath the perforated plate 320. The perforated plate 320 has not only the function to receive something falling from the bucket conveyor 200 but also the function to prevent the hot-water surface from waving (or swinging) when the containers 11 holding fluid diet are transported by the bucket conveyor 200.

The process for sterilizing a container holding a fluid diet according to the present invention will be described below by giving an example in which the sterilization apparatus 100 described above is used.

The fluid diet to which the present invention is applicable may include diets having a fluidity as exemplified by not only liquid diets such as fruit juice and other drinks but also diets having gelled softly enough to be suckable with a straw or the like, e,g, jelly drinks (jelly diets having gelled softly or partly enough to retain a fluidity). It may preferably be those which can be handled by the hot packing. Accordingly, acidic fluid diets prepared so as to have a pH of 4.2 or below are preferred.

The container used in the present invention may be any of those having a long and slender mouth. It may be made of any materials such as plastics and laminated films, and may be in the form of any of bags, bottles and cans. Since, however, some of them may require addition of the step of sterilizing the mouth to complicate the process compared with usual hot packing, the present invention may preferably be applied to containers whose mouths can be sterilized with difficulty by usual hot packing. Stated specifically, such containers may preferably be those having a mouth having an inner diameter of 1.5 cm or less and a length of 1 cm or more.

Figure 8:
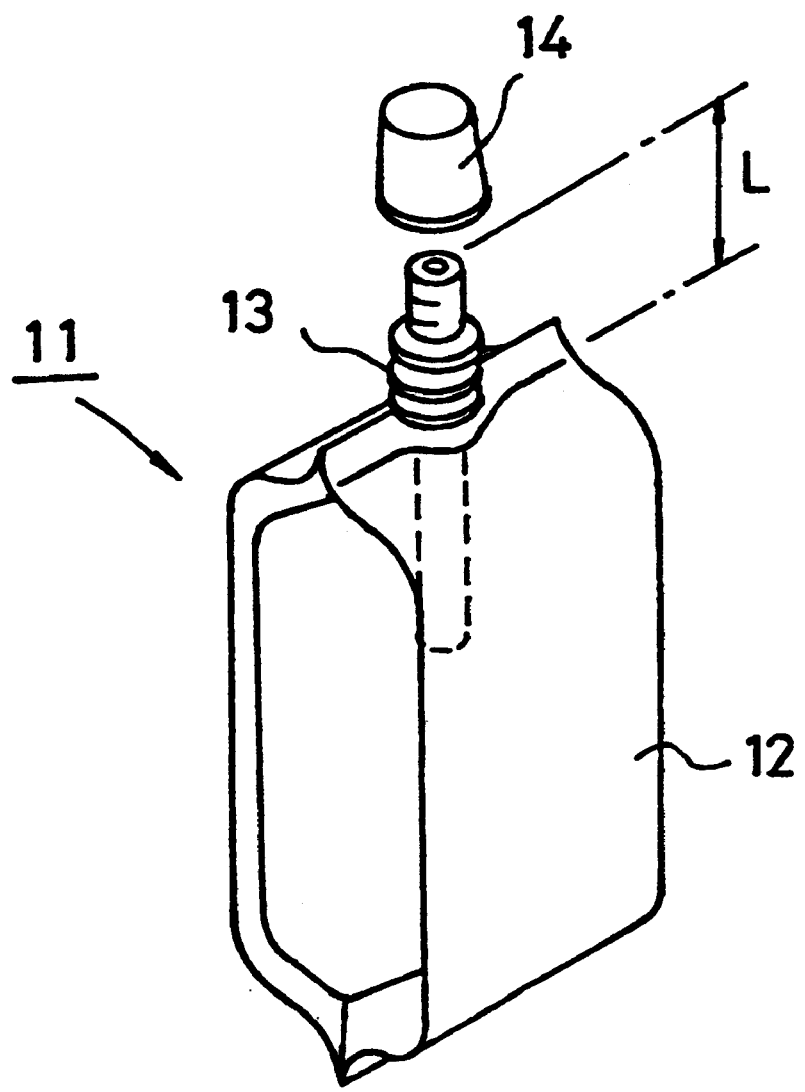
FIG. 8 is a perspective view showing an example of the container to which the present invention is applied.

What is most preferred as the container used in the present invention is the container 11 as shown in FIG. 8, which comprises a bag member 12 formed of a laminated film, a mouth 13 having the shape of a straw, inserted to one end of the bag member 12 and joined to the bag member 12 by, e.g., heat sealing, and a cap 14 thread-fitted to the mouth 13. This container 11 has the straw-shaped mouth 13, and hence it is especially difficult to sterilize the mouth 13 and cap 14, compared with usual containers. Thus, it is greatly advantageous to apply the present invention to such a container.

In the process of the present invention, the fluid diet is previously heated and sterilized, and thereafter put into the container as it is kept at a high temperature. At this stage, the inner walls of the main body of the container, i.e., referring to the container 11 shown in FIG. 8, the inner walls of the bag member 12 immediately come in contact with the heated fluid diet and hence are effectively sterilized. However, the inner walls of the mouth 13 and cap 14 are still not well sterilized at this point of time because the fluid diet does not immediately flow into these portions and, even when flowed in, its temperature drops in that course.

Containers filled with fluid diet by means of the filling machines (not shown) are carried onto the respective lines 111, 112, 113 and 114 of the first feed conveyor 110. The containers moved forward on the first feed conveyor 110, having reached the terminal of the first feed conveyor 110, are carried onto the corresponding lines 121, 122, 123 and 124 of the second feed conveyor 120, where they are transported at a higher speed and hence transported at broader intervals between them.

As shown in FIG. 3, the three timing gates 130, 140 and 150 provided on the second feed conveyor 120 cause the containers being transported while holding fluid diet, to temporarily stop and then, taking timing, successively bring them from the forwardmost timing gate 150 into the buckets 210 of the bucket conveyor 200 with their upside down to make them supported there. The reason why the timing gates are provided in plurality at given intervals is to make control so that the containers 11 can be one by one put into the bucket conveyor 200.

Figure 7:
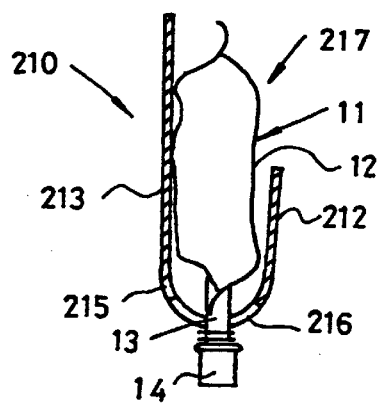
FIG. 7 is a vertical cross section of a bucket of the bucket conveyor used in the apparatus.

After the containers are put into the buckets 210 of the bucket conveyor 200, as shown in FIGS. 6 and 7 their mouths 13 and caps 14 are each made to project downward through the through-hole 216 formed in the bottom of the bottom wall 215 of the bucket 210, so that only the mouth 13 and the vicinity thereof are immersed in hot water H of the hot-water bath 300. In this state, the containers are transported in the longitudinal direction of the hot-water bath 300. As the result, the inner walls of the mouth 13 and cap 14 of each container 11 can be well heated and sterilized. Moreover, the fluid diet filled in the container 11 is by no means again heated, and hence can be prevented from deterioration of flavor of the fluid diet or decrease in jelly strength which may be caused by excessive heating.

In the foregoing, the hot water H of the hot-water bath 300 may preferably have a temperature of from 85° C. to 98° C., and more preferably from 90° C. to 95° C. The immersion time for which the mouth 13 of the container 11 is immersed in the hot-water bath 300, i.e., in the above example the time for which it is moved through the hot-water bath 300 by means of the bucket conveyor 200, may preferably be from 1 minute to 10 minutes, and more preferably from 1 minute to 5 minutes.

In the above example, the containers 11 are moved by the bucket conveyor 200 while their mouths 13 are immersed in the hot-water bath 300. Alternatively, in the working of the sterilization process of the present invention, it is possible to use a transport means such that the containers 11 are moved while being hung with their up sides down. Still alternatively, the containers 11 may be immersed in the hot-water bath 300 in a batch system while being held on an appropriate frame member with their up sides down.

The containers 11 having moved through the hot-water bath 300 while being held by the bucket conveyor 200 are released from the buckets 210 at the terminal of the bucket conveyor 200, thereafter carried on a delivery conveyor 500, and sent to the next step. Incidentally, as shown in FIG. 7, the front plate 212 of the front and rear plates 212 and 213 of the bucket 210 is set shorter so that a large opening 217 can be made in the delivery direction of the container 11 and so that the container 11 can readily drop from the bucket 210 at the terminal of the bucket conveyor 200.

EXAMPLE 1

Maltodextrin, fructose-glucose liquid sugar, muscat juice, agar, citric acid, thickening polysaccharide, sodium citrate, a perfume, potassium chloride, vitamin C, niacin, calcium pantothenate, vitamin $B_2$ and vitamin $B_1$ were added in water, followed by heating to dissolve them to prepare a jelly drink.

The containers 11 as shown in FIG. 8 were each filled with 180 g of this jelly drink in the state it was heated to 90° C., and their mouths 13 and caps 14 were sterilized using the sterilization apparatus shown in FIGS. 1 to 7. The temperature of the hot water H of the hot-water bath 300 was set to 93° C., and the time for which the containers moved through the hot-water bath 300 by means of the bucket conveyor 200, i.e., their immersion time in the hot water H, 3 minutes.

100 bags of the packed jelly drink thus obtained were left to stand at 25° C. for 7 days, and thereafter the number of jelly drink bags having caused putrefaction due to microorganisms was examined to find that it was 0.

Comparative Example 1

The same jelly drink as in Example 1 was prepared, and the containers 11 as shown in FIG. 8 were each filled with 180 g of this jelly drink in the state it was heated to 90° C. Immediately thereafter, these were turned upside down so that the inner surfaces of their mouths 13 and caps 14 were brought into contact with the jelly drink to make sterilization.

100 bags of the packed jelly drink thus obtained were left to stand at 25° C. for 7 days, and thereafter the number of jelly drink bags having caused putrefaction due to microorganisms was examined to find that it was 3.

As described above, according to the sterilization process of the present invention, when a container having a long and slender mouth is filled with a fluid diet, the inner surface of the mouth can be surely sterilized without consuming heat energy as far as possible, and also the quality of the fluid diet held in the container can be prevented from deterioration due to excessive heating. According to the sterilization apparatus of the present invention, the above sterilization process of the present invention can be carried out under industrially automated conditions.

What is claimed is:

1. A process for sterilizing a container holding a fluid diet, said container having a mouth protruding from an upper portion of said container comprising:
   filling the container with a fluid diet in a heated state,
   sealing the container at the mouth thereof,
   thereafter inverting the container, and,
   immersing the mouth in a hot-water bath wherein said hot-water bath has a water temperature capable of sterilizing said container and fluid diet.

2. The process according to claim 1, wherein said mouth of said container has an inner diameter of 1.5 cm or less and a length of 1 cm or more.

3. The process according to claim 1, wherein said container holding a fluid diet and inverted is inserted and supported in a bucket conveyor, and the mouth is immersed in the hot-water bath while transporting the inverted container for a time sufficient to sterilize said container and fluid diet, and the container is afterward removed.

4. The process according to claim 1, wherein said fluid diet is an acidic drink or jelly drink having a pH of 4.2 or below.

5. The process according to claim 1, wherein said water temperature is from 85° C. to 98° C., and the mouth of said container is immersed in the hot-water bath for an immersion time of from 1 minute to 10 minutes before being removed.

6. The process according to claim 1, wherein said container comprises
   a bag member formed of a flexible sheet,
   a straw-shaped mouth inserted into the bag member and
   a cap thread-fitted to the tip of the mouth.

7. An apparatus for sterilizing a container holding a fluid diet, said container having a mouth protruding from an upper portion of said container and being filled with the fluid diet and sealed, said apparatus comprising:
   a bucket conveyor for transporting and supporting the container holding a fluid diet in an inverted position, said bucket conveyor provided with a plurality of buckets, each of said buckets having a bottom wall with a through-hole defined therein for receiving the mouth and a cap of the inverted container whereby the mouth and cap project therethrough;
   a feed conveyor for carrying the container and fluid diet into a bucket of the bucket conveyor at the starting end thereof while supporting the inverted container; and
   a hot-water bath provided along a transport path of the bucket conveyor and capable of holding heated water so that the mouth of the inverted container holding a fluid diet is immersed in said bath while the container is supported on the bucket conveyor.

8. The apparatus according to claim 7, wherein said feed conveyor is provided with a plurality of timing gates for blocking the movement of a plurality of containers so that each of said containers holding a fluid diet is delivered at a given time to said bucket conveyor.

9. The apparatus according to claim 7, wherein said hot-water bath further comprises:
   a hot-water bath main body formed of a plate having a heat insulating material,
   at least one partition plate provided at least at the middle in the depth direction of the bath so as to partition the hot-water bath main body at given intervals in its longitudinal direction, and
   at least one steam jetting pipe provided in the hot-water bath main body.

10. A process for sterilizing a container holding a fluid diet, said container having a mouth protruding from said container, using the apparatus defined in claim 7, comprising:
    filling the container with the fluid diet in a heated state
    sealing the container at the mouth thereof, and
    thereafter inverting the container and immersing the mouth in a hot-water bath wherein said hot-water bath has a water temperature capable of sterilizing said container and fluid diet.

11. The process according to claim 10, wherein said mouth of the container has an inner diameter of 1.5 cm or less and a length of 1 cm or more.

12. The process according to claim 10, wherein said inverted container holding a fluid diet is inserted and supported in the bucket conveyor, and the mouth is immersed in the hot-water bath while transporting the inverted container for a time sufficient to sterilize said container and fluid diet, and the container is afterward removed.

13. The process according to claim 10, wherein said fluid diet is an acidic drink or jelly drink having a pH of 4.2 or below.

14. The process according to claim 10, wherein said hot-water bath has a water temperature of from 85° C. to 98° C. and the mouth of the container is immersed in the hot-water bath for an immersion time of from 1 minute to 10 minutes before being removed.

15. The process according to claim 10, wherein said container comprises
    a bag member formed of a flexible sheet,
    a straw-shaped mouth inserted into the bag member, and
    a cap thread-fitted to the tip of the mouth.

16. The apparatus defined in claim 7 wherein each of said buckets is constructed and arranged to receive a container comprising
    a bag member formed of a flexible sheet,
    a straw-shaped mouth inserted into the bag member, and
    a cap thread-fitted to the tip of the mouth.

* * * * *